US007181322B2

(12) United States Patent
Bivas

(10) Patent No.: US 7,181,322 B2
(45) Date of Patent: Feb. 20, 2007

(54) AMMUNITION LOADING VEHICLE AND METHOD

(75) Inventor: Refael Bivas, Jerusalem (IL)

(73) Assignee: B.L. USA Inc., Cleveland, OH (US)

( * ) Notice: Subject to any disclaimer, the term of this patent is extended or adjusted under 35 U.S.C. 154(b) by 97 days.

(21) Appl. No.: 10/150,493

(22) Filed: May 20, 2002

(65) Prior Publication Data

US 2003/0216840 A1 Nov. 20, 2003

(51) Int. Cl.
*E02F 9/00* (2006.01)
*B60K 28/00* (2006.01)

(52) U.S. Cl. .......................... 701/1; 180/273; 414/406

(58) Field of Classification Search .................... 701/1; 180/9.36, 6.24, 6.62, 9.38, 9.42, 273, 287; 414/406, 408, 420, 685; 60/421, 426, 427, 60/429, 438

See application file for complete search history.

(56) References Cited

U.S. PATENT DOCUMENTS

| | | | | |
|---|---|---|---|---|
| 3,327,816 | A * | 6/1967 | Eaton | 188/195 |
| 4,671,376 | A * | 6/1987 | Ito et al. | 180/249 |
| 4,763,742 | A | 8/1988 | Langford | |
| 4,884,475 | A * | 12/1989 | Walzer et al. | 74/862 |
| 4,893,689 | A * | 1/1990 | Laurich-Trost | 180/414 |
| 4,898,078 | A * | 2/1990 | Gage et al. | 91/524 |
| 4,995,276 | A | 2/1991 | Zaunberger | |
| 5,034,892 | A | 7/1991 | Saotome | |
| 5,114,299 | A * | 5/1992 | Roche et al. | 414/722 |
| 5,169,277 | A * | 12/1992 | Orser et al. | 414/685 |
| 5,219,413 | A * | 6/1993 | Lineberger | 180/272 |
| 5,503,232 | A * | 4/1996 | Matsushita et al. | 172/2 |
| 5,564,518 | A | 10/1996 | Ishii et al. | |
| 5,609,221 | A | 3/1997 | Endsley et al. | |
| 5,706,909 | A * | 1/1998 | Bevins et al. | 180/273 |
| 5,946,910 | A * | 9/1999 | Hayashi et al. | 60/421 |
| 6,033,176 | A * | 3/2000 | Bartlett | 414/408 |
| 6,189,641 | B1 | 2/2001 | Azuma | |
| 6,332,745 | B1 * | 12/2001 | Duel et al. | 414/406 |
| 6,425,450 | B1 * | 7/2002 | Lansberry | 180/9.36 |
| 6,877,577 | B1 * | 4/2005 | Smith | 180/242 |

* cited by examiner

*Primary Examiner*—Dalena Tran
(74) *Attorney, Agent, or Firm*—Renner, Otto, Boisselle & Sklar, LLP

(57) ABSTRACT

A motorized hydraulically-operated and driven aircraft loading vehicle is particularly suited for the loading of bombs, which are raised by a pair of hydraulically-operated arms. Vehicle has two selectable operation modes. A first, working mode provides four-wheel hydraulic steering and enables vehicle to be driven at a small turning radius, and at a speed of up to 10 km/h. A second, traveling mode automatically locks the rear wheel steering system allowing vehicle to be driven at a speed of up to 20 km/h, all being computer controlled.

Safety devices include an emergency stop switch and a no-driver no-actuation switch, and devices preventing accidents if hydraulic power is lost.

3 Claims, 5 Drawing Sheets

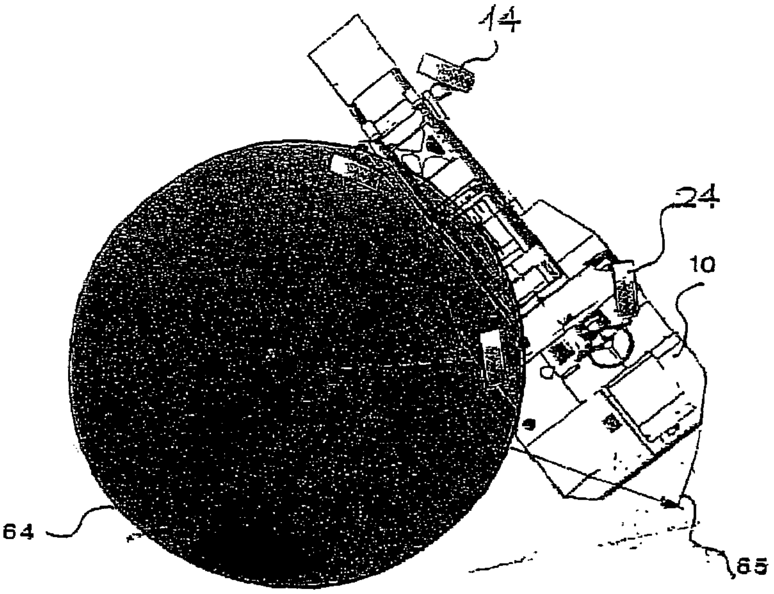
FIG. 3
FIG. 4
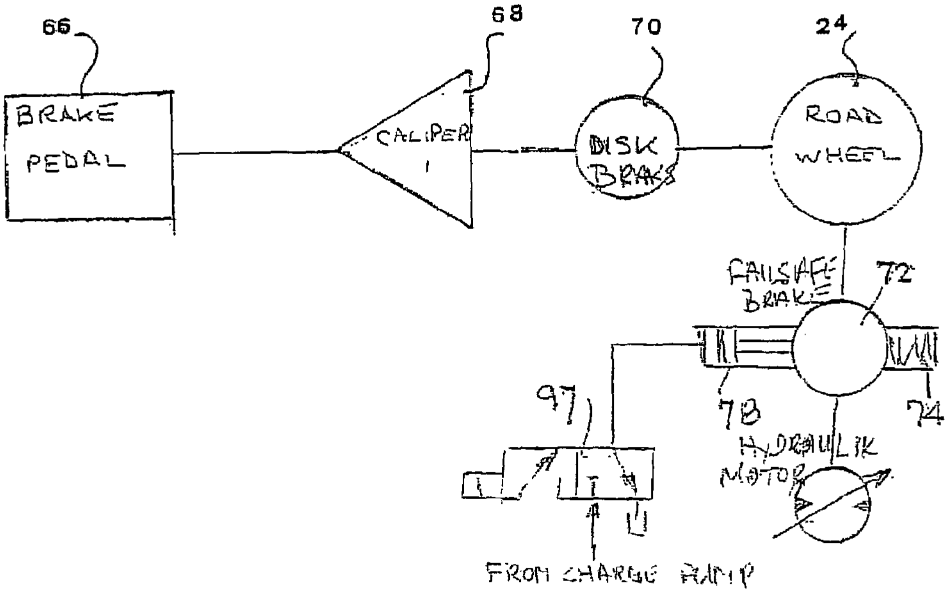

AMMUNITION LOADING VEHICLE AND METHOD

FIELD OF INVENTION

The present invention relates to the loading of aircraft.

More particularly, the invention provides a wheeled vehicle for collecting, transporting and raising a load such as a bomb, rocket, pylon or fuel tank for attachment to an aircraft, typically under the wing thereof, or under the belly.

BACKGROUND OF THE INVENTION

One of the tasks in servicing military aircraft is to replace items such as bombs, rockets and fuel tanks which have been ejected in a previous mission. Bombs and rockets are usually carried externally and are releasably held by appropriate pylons under the aircraft wings. While small ordnance items could be assembled manually, the attachment of heavy items, for example bombs weighing hundreds of kilograms, requires the use of a mechanical loader. For this purpose vehicles have been developed which have a low long front to allow access under an aircraft wing, and a hydraulic boom between the front wheels to which the required item is attached and then raised in a position allowing attachment to the aircraft pylon. The loader vehicle may then be used to collect, transport and raise further items. Such vehicle will henceforth be referred to as a bomb loader, or simply as the vehicle.

Hydraulically operated bomb loaders are in service in many countries, but the functioning thereof leaves much to be desired. A bomb loader must meet somewhat contradicting requirements. Fast execution of its task is essential when the aircraft to be loaded is to carry out several successive missions in a tight time frame. However, due to the nature of the loads being handled, it is mandatory that highest possible safety standards are adhered to. Furthermore, the bomb loader is often required to maneuver in restricted space areas such as aircraft hangars wherein aircraft and servicing equipment leave little free space. Meeting these requirements is the primary aim of the present invention.

A patent search carried out failed to produce any relevant prior art. However it is known that the British firm "Portsmouth Aviation Ltd." manufactures a motorized bomb loader as well as a Trolley Weapon Loading device referred to as Type R Mk2. Hydraulic power is provided by a hand pump, and the trolley naturally requires a tractor for locomotion.

A further prior-art bomb loader is known as the MJ-1, which is however not equipped with safety features which are an important part of the present invention. This vehicle also has a turning circle twice as large as the subject of the present invention.

It is therefore one of the objects of the present invention to obviate the disadvantages of prior art bomb loading vehicles and to provide a bomb loader which is more maneuverable than previously known vehicles. It is a further object of the present invention to provide multiple safety features aimed at carrying out the allotted task without mishap.

The present invention achieves the above objects by providing a motorized hydraulically-operated and driven aircraft loading vehicle particularly suited for the loading of bombs, the vehicle being provided with a pair of hydraulically-operated arms for raising and lowering a load, the vehicle having two selectable operation modes, a first, working mode providing four-wheel hydraulic steering and enabling the vehicle to be driven at a small turning radius, and at a speed of up to 10 km/h, and a second, traveling mode wherein the rear wheel steering system is automatically locked at straight orientation and the vehicle can be road driven at a speed of up to 20 km/h. All systems of the vehicle are computer controlled.

In a preferred embodiment of the present invention there is provided an aircraft loading vehicle wherein two independent braking systems are provided, a first braking system of conventional design for normal use and a second braking system hydraulically operated and automatically applied in case of loss of hydraulic pressure.

In a further preferred embodiment of the present invention the systems are electrically controlled and not mechanically.

In a most preferred embodiment of the present invention there is provided an aircraft loading vehicle further including an emergency hand-operated pump, the pump being usable to release the second braking system and to operate the arms upwards or downwards.

Yet further embodiments of the invention will be described hereinafter.

It will thus be realized that the novel device of the present invention makes significant progress over the prior art in providing a bomb loader that is faster, safer and easier to maneuver than previously known vehicles for this purpose. A further advantage of the present bomb loader is that the diesel engine driving the hydraulic system when idle runs at only 900 rpm, thus reducing noise, fuel consumption and engine wear. Computer 95 converts the engine speed signal into an automotive drive characteristics to control the non feed back proportional axial piston pump, plus an electric two speed bent axis motor.

The computer 95 controls the axial piston pump via two proportional pressure reducing valves. The automotive control curve, is a function of the engine speed measured with the integral pulse pickup mounted on the pump.

Two driving modes conditions.

Selected Via Mode Switch:

A. Working mode/Combined front and rear steering.

B. Traveling mode/Front steering only.

It will further be understood that the vehicle is not limited to the previously-specified duties but can be used for lifting and transferring loads for many other purposes, and easily be adapted for lifting a person, for example a maintenance technician.

The invention will now be described further with reference to the accompanying drawings, which represent by example preferred embodiments of the invention. Structural details are shown only as far as necessary for a fundamental understanding thereof. The electrical and hydraulic circuits show only essential features and do not include items of conventional vehicle design. The described examples, together with the drawings, will make apparent to those skilled in the art how further forms of the invention may be realized.

FIG. **2*a*** is a detail of the displacement pump illustrating the electric operation thereof.

Figures 5, 6:
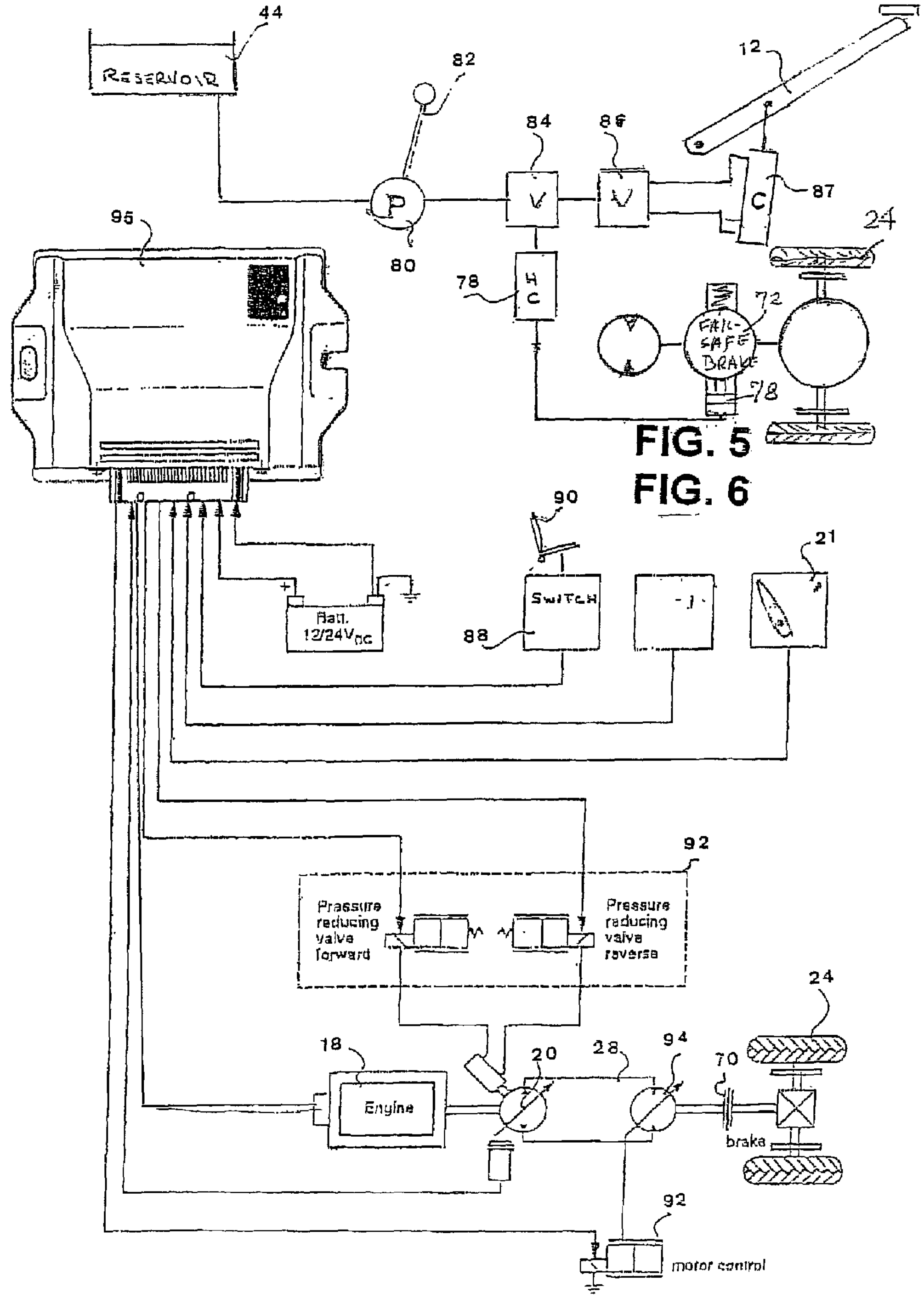
Figure 7:
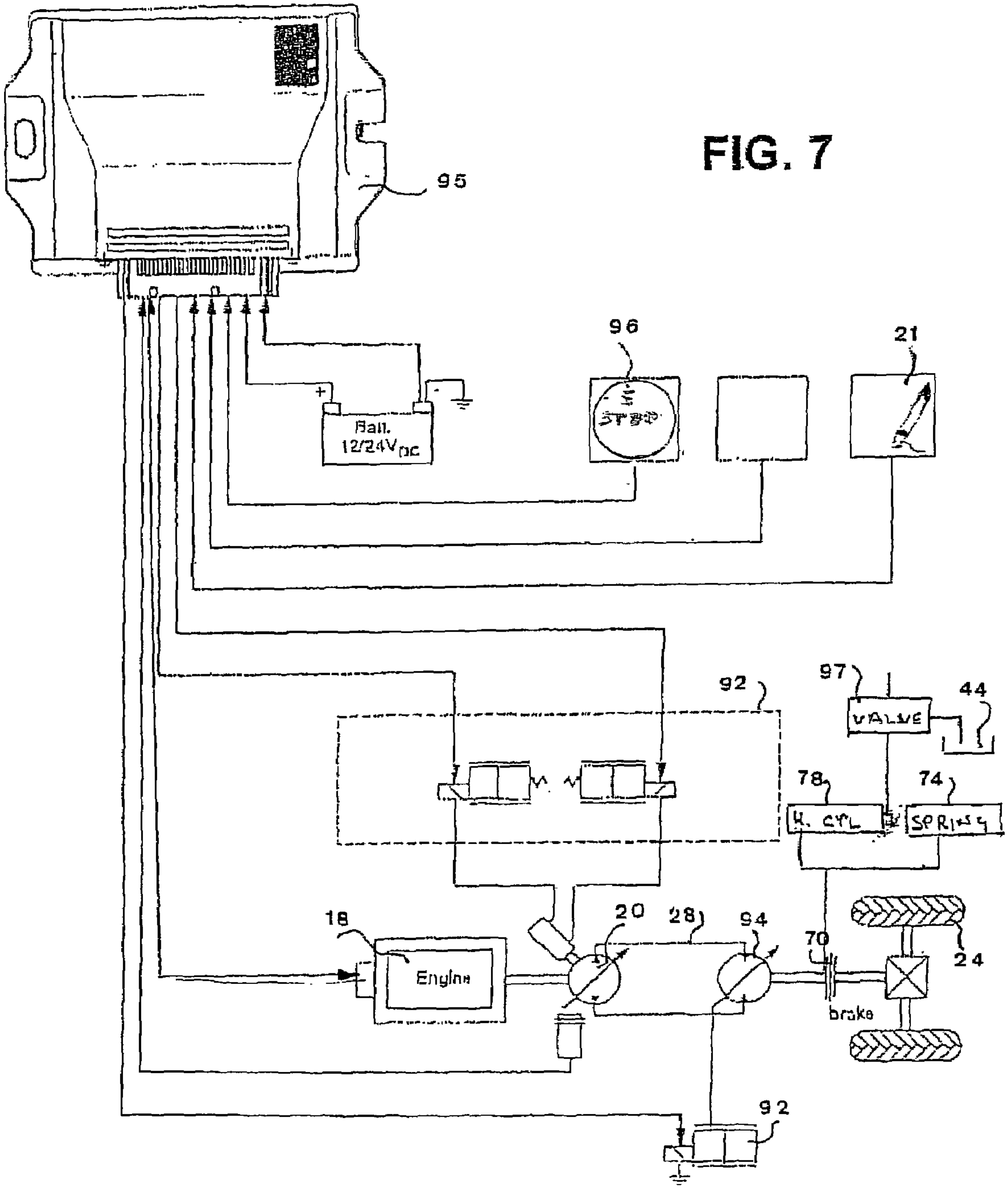

FIG. 3 is a plan showing the 4-wheel steering being used to achieve a tight turning circle;

FIG. 4 is a block diagram representing the two braking systems;

FIG. 5 is a diagrammatic view of the hand pump circuit;

FIG. 6 is a schematic representation of the no-driver safety system;

FIG. 7 is a schematic representation of the emergency switch arrangement; and

Figure 8:
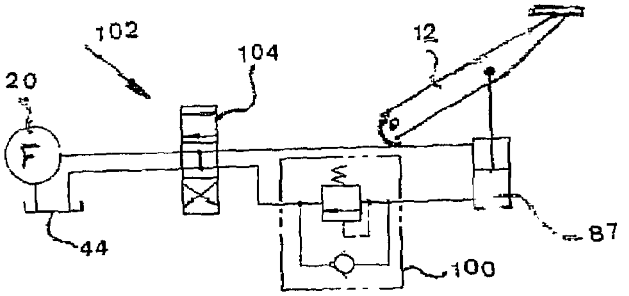

FIG. 8 is a hydraulic circuit for a safety valve for preventing accidents in case of hydraulic failure.

DETAILED DESCRIPTION OF PREFERRED EXEMPLARY EMBODIMENTS

Figure 1:
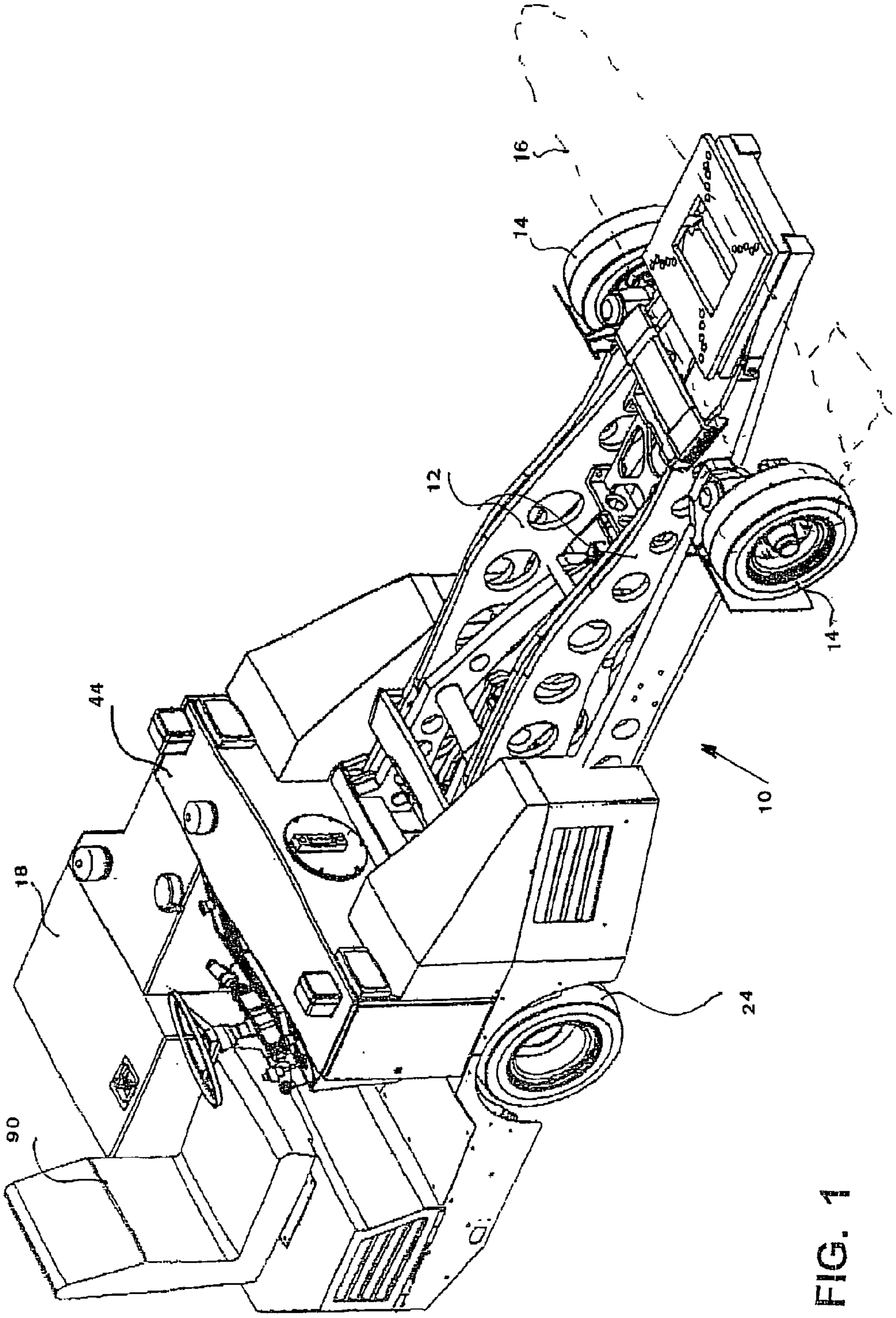
FIG. 1 is a perspective view of a preferred embodiment of the bomb loader according to the invention.

There is seen in FIG. 1 a motorized hydraulically-operated and driven vehicle 10 particularly suited for the loading of aircraft with bombs, rockets fuel tanks and other items within its rated capacity. The illustrated vehicle can raise and transport up to 1500 kg, the driver sitting at the rear of the vehicle in seat 90. The vehicle 10 is provided with a pair of hydraulically-operated arms 12, seen between the front wheels 14, for raising and lowering a load 16. The arms 12 are shown in their lower position, usually used for loading and traveling.

Figure 2:
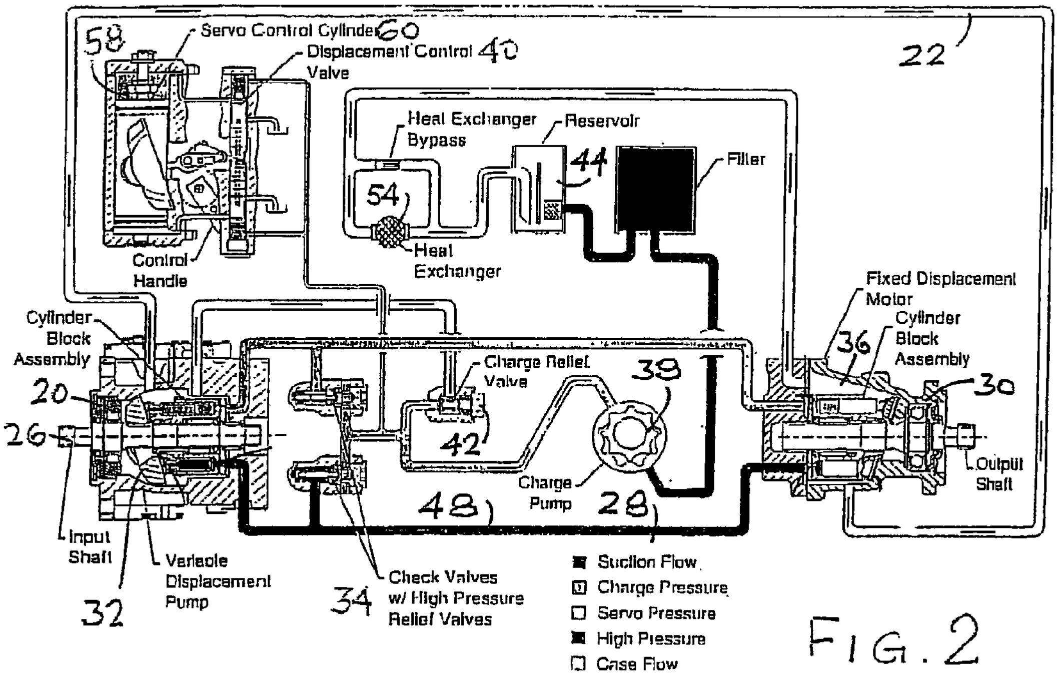
FIG. 2 is a diagram of a hydraulic circuit for driving a road wheel.
Figure 2A:
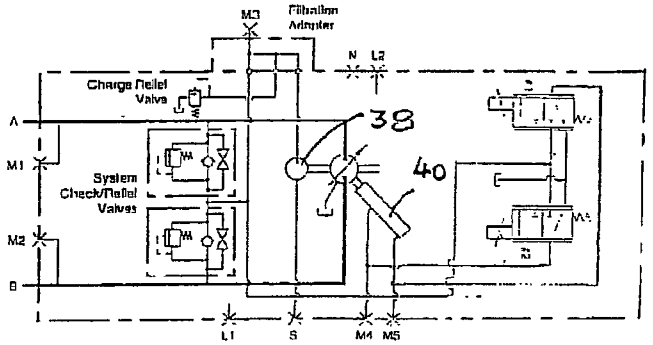

The vehicle is powered via hydraulic circuits, an example of which is seen in FIG. 2, by an internal combustion engine 18 coupled to a hydraulic pump 20, receiving oil from a reservoir 44.

The vehicle 10 has two operation modes, selectable by means of a mode switch 21 seen in FIG. 6.

A first, working mode providing four-wheel hydraulic steering, as seen in FIG. 3, and enabling the vehicle to be driven at a small turning radius, and at a speed of up to 10 km/h.

A second, traveling mode may be selected wherein the rear wheel steering system (not seen) is automatically locked at straight orientation and the vehicle can be road driven at a speed of up to 20 km/h.

With reference to the rest of the figures, similar reference numerals have been used to identify similar parts.

The working mode is controlled by a computer 95 which converts the engine speed signal into an automotive drive characteristics to control the non feed back proportional axial piston pump, plus an electric two speed bent axis motor.

Referring now to FIG. 2, there is seen one of the hydraulic circuits 22 driving one of the road wheels 24 (seen in FIG. 1. The circuit 22 is typical of several other circuits which are not shown). A reversible variable displacement pump 20 is driven by the internal combustion engine 18 (FIG.7) connected to its input shaft 26.

In the main circuit 28 oil flows between the pump 20 and the hydraulic motor, which is in the present circuit, a fixed displacement motor 30. The rate of oil flow in the main circuit 28, and consequently the motor speed, is determined by the pump displacement which is proportional to the pump swash-plate 32 angle. The direction of oil flow depends on whether the swash-plate angle is negative or positive. Thus the direction of vehicle travel can be selected. A variable displacement motor (seen in FIG. 8) is used in circuits which require a larger range of output speeds. High pressure relief valves 34 are built into the pump 20 to limit output torque.

A charge pump 38 functions to replenish oil lost in the main circuits 28 through leakage. The charge pump 38 supplies oil at constant pressure for use of the servo control valve 40. When the pump swash-plates 32 are in neutral position, the charge pump flow which is not required for replenishing leaked oil passes through the charge relief valve 42 into the pump 20 and back to the reservoir 44. In forward or reverse drive the charge pump 38 supplies oil through the charge check valve 34 on the low pressure side 48 of the main circuit 28. Oil from the low pressure side 48 flow to a heat-exchanger 54, and then to the reservoir 44.

The servo control valve 40 maintains the constant swash-plate angle. The pump swash-plate 32 is held in a mechanical neutral position by pre-compressed springs 58 within the servo-control cylinders 60, thus locking the wheels 24 if hydraulic power is lost, for example due to damage of a hydraulic tube.

FIG. 3 again illustrates the aircraft bomb loading vehicle 10 seen in FIG. 1. The good maneuverability of the vehicle 10 is due to its small turning radius 64, made possible because both front 14 and rear wheels 24 can be steered. The turning radius measured at the inner face of the vehicle is about 1.6 meters. Measured externally the turning circle radius is just over 3.3 meters.

Seen in FIG. 4 is a block diagram of a further embodiment of the bomb loader. At least one pair of the road wheels 24 of the vehicle are provided with two independent braking systems 66, 72.

A first braking system 66 includes a caliper 68 disk 70 brake of conventional design for normal use.

A second braking system 72 is spring 74 operated. To release the brake, hydraulic pressure is applied to overcome the spring 74.

Consequently, loss of hydraulic pressure results in the spring 74 immediately locking the wheels 24. Release of the parking brake push button 76 allows hydraulic pressure to enter a cylinder 78 which opposes the spring 74 and reopens the failsafe brake 72.

Referring now to FIG. 5, there is depicted a detail of an embodiment of the aircraft loading vehicle further including an emergency hand-operated hydraulic pump 80, operated by the handle 82. The pump 80 is intended for use if normal hydraulic pressure is lost, for example as result of a hose failure.

A selector valve 84 enables the pump 80 to be used either to release the second braking system 72 seen in the previous figure, or to send oil through a directional control valve 86 to a hydraulic cylinder 87 whereby it is possible to operate the arms 12 upwards or downwards.

FIG. 6 diagrammatically shows details of a further embodiment of the aircraft loading vehicle.

As a further safety measure, there is further provided a switch element 88 activated by the weight of the driver sitting in his seat 90.

If for any reason the driver is not in his seat 90, the switch 88 deactivates a solenoid operated hydraulic valve 92 to divert hydraulic fluid from driving the road wheels 24, to the reservoir 44 seen in FIG. 7.

Also, a second valve 94 diverts hydraulic fluid from the second brake system 72 seen in FIG. 4 thus allowing the springs 74 to apply the brake system 72 used for parking, and halting the vehicle.

The computer 95 coordinates all these functions.

FIG. 7 diagrammatically illustrates a detail of a bomb loader provided with a hand-operated emergency switch 96.

Operation of the switch 96 shuts down the internal combustion engine 18 powering the hydraulic systems. Hydraulic pressure is retained in the actuators 87 (seen in FIG. 5) raising the hydraulically-operated arms 12, which are locked in place.

Furthermore, power is cut from the solenoid-operated valve 97 which then diverts hydraulic fluid from the hydraulic cylinder 78, thus causing the springs 74 to apply the parking brake 72 and halting the vehicle.

Seen in FIG. 8 is a detail of a bomb loader further including a rupture valve 100 in the hydraulic system 102 operating the hydraulically-operated arms 12 seen in FIG. 1. The rupture valve 100 prevents the falling of the arms 12 if hydraulic pressure thereto is lost. The arms 12 are normally operated by the electric proportional directional control valve 104.

The vehicle according to the invention, the First working mode unable precise and safe working up to 10 km/h with 4-wheel steering which allows extremely small turning radius (1.5 m) and very high maneuverability required in hangars and other limited areas. This reduces the total loading time by 50% in comparison to other bomb loaders.

The operation of the vehicle is as follows:

After work mode is chosen, when the front wheel steering system reaches straight position, automatically the front and rear steering systems combine together into one unit. In this mode the hydrostatic pump receives a flat and precise command from the computer.

The traveling mode operation, up to 20 km/h, operates only with 2 front wheel drive system for high stability at higher speeds on open road.

When traveling mode is chosen, automatically by means of the Computer when the front and rear steering systems go into straight and parallel position, the rear steering system locks and the front steering system is still in operation. In this mode the hydrostatic pump receives a 45° curve from the computer and the hydrostatic motor goes into second speed up to 20 km/h.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

I claim:

1. A motorized hydraulically-operated ammunition loading vehicle, the vehicle comprising:

a front wheel steering system and a rear wheel steering system, wherein each wheel steering system is independently steerable; and a computer system to control the operation of the vehicle according to either a driving operation mode, in which a rear wheel steering system is locked in a generally straight orientation, or a loading operation mode, in which a front wheel steering system and said rear wheel steering system are individually steerable to enable high maneuverability of the vehicle, wherein in said loading mode the vehicle is adapted to have a turning radius measured at the inner face of the vehicle of approximately 1.6 meters.

2. A motorized hydraulically-operated ammunition loading vehicle, the vehicle comprising:

a front wheel steering system and a rear wheel steering system, wherein each wheel steering system is independently steerable; and a computer system to control the operation of the vehicle according to either a driving operation mode, in which a rear wheel steering system is locked in a generally straight orientation, or a loading operation mode, in which a front wheel steering system and said rear wheel steering system are individually steerable to enable high maneuverability of the vehicle, wherein in said loading mode the vehicle is adapted to rotate at a speed of up to 10 km/h.

3. An ammunition loading method, comprising:

operating an ammunition loading vehicle in a driving operation mode, wherein a rear wheel steering system is locked in a generally straight orientation; and operating said ammunition loading vehicle in a loading operation mode, wherein a front wheel steering system and said rear wheel steering system are individually steerable to enable high maneuverability of said vehicle, wherein the vehicle is adapted to have a turning radius measured at the inner face of the vehicle of approximately 1.6 meters.

* * * * *